United States Patent [19]

Ainoura

[11] 4,354,328
[45] Oct. 19, 1982

[54] SCREW TYPE HONE ASSEMBLY FOR THE HONING OF GEARS

[76] Inventor: Masato Ainoura, 1253-Eguchi, Kitashige Yasu-cho, Miyaki-gun, Saga-ken, Japan

[21] Appl. No.: 177,485

[22] Filed: Aug. 12, 1980

[30] Foreign Application Priority Data

Feb. 11, 1980 [JP] Japan .................. 55-15146

[51] Int. Cl.$^3$ .................. B23F 21/03; B24D 5/00
[52] U.S. Cl. .................. 51/206.4; 51/168
[58] Field of Search .................. 51/206 R, 206 P, 168, 51/95 GH, 26; 308/176, 237 A, 238; 403/373, 203, 225, 259, 261

[56] References Cited

U.S. PATENT DOCUMENTS

| | | | |
|---|---|---|---|
| 158,617 | 1/1875 | Bannister | 51/168 |
| 528,726 | 11/1894 | Hyde | 51/168 |
| 686,462 | 11/1901 | Koelkebeck | 51/168 |
| 743,307 | 11/1903 | Messer | 51/168 |
| 1,194,566 | 8/1916 | Stewart | 51/206 R |
| 2,187,350 | 1/1940 | Kuzmick | 51/168 |
| 3,277,611 | 10/1966 | Cook | 51/206.4 |
| 3,604,771 | 9/1971 | Luzsicza | 308/238 |
| 3,772,831 | 11/1973 | Shaw | 51/206 R |

FOREIGN PATENT DOCUMENTS 749649  2/1978  U.S.S.R. .................. 51/206 P

OTHER PUBLICATIONS

Krar, et al., *Grinding Technology* ©1974, pp 19–22.

Primary Examiner—Stephen G. Kunin
Assistant Examiner—Robert A. Rose
Attorney, Agent, or Firm—Armstrong, Nikaido, Marmelstein & Kubovcik

[57] ABSTRACT

The present invention provides a screw type hone assembly for the honing of gears manufactured by the gear cutting by forming process, the gear cutting by generating process or other like process. The hone assembly comprises a cylindrical sleeve mounted on the rotating shaft of a honing device and a hone body resiliently supported on the sleeve such that it is movable in the axial and radial directions thereof. The hone body includes spiral threads composed of a rigid body and a honing grain layer deposited thereon. The honing grain layer contains hard grains. The screw type hone assembly can easily be attached to or detached from the rotating shaft, and can readily be replaced by another screw type hone.

6 Claims, 7 Drawing Figures

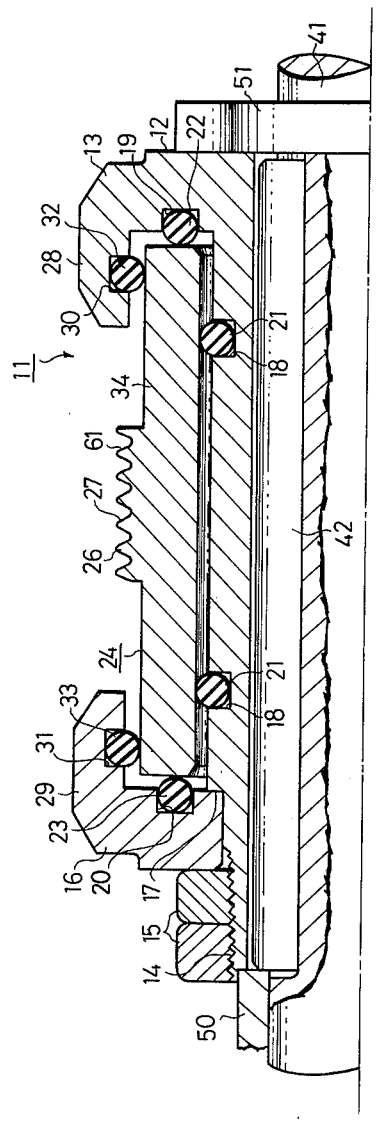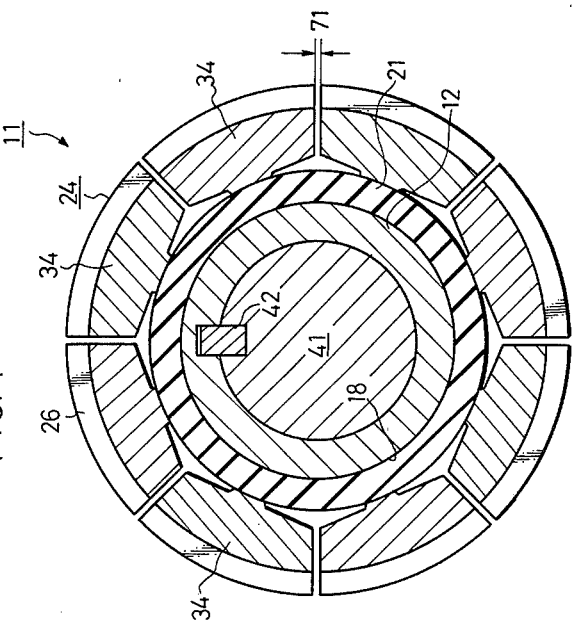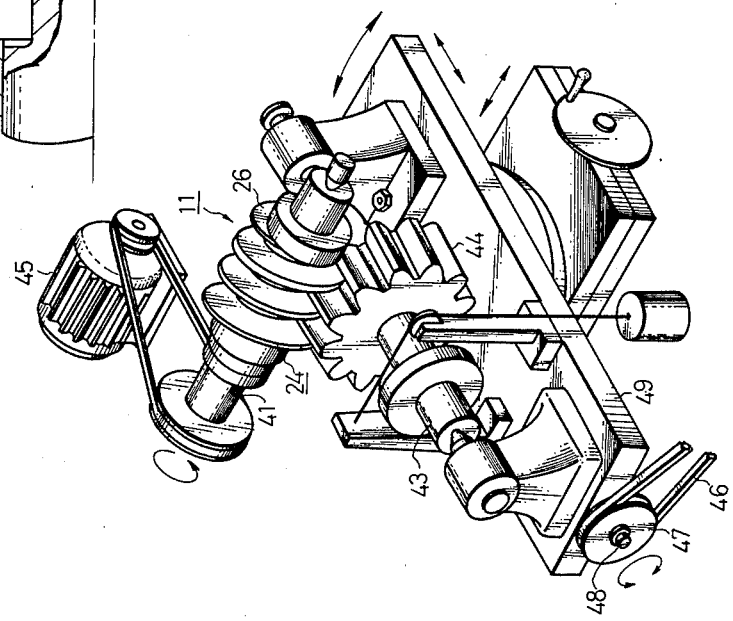

SCREW TYPE HONE ASSEMBLY FOR THE HONING OF GEARS

BACKGROUND OF THE INVENTION

1. Field of the Invention

The present invention relates to a screw hone assembly adapted for use in the honing of a gear manufactured by the gear cutting by forming process, the gear cutting by generating process or other like process.

The purpose of the gear honing is to improve the smoothness or flatness and dimensional accuracy of the tooth surface of the gear, following the shape thereof.

2. Description of the Prior Art

As shown in FIG. 7, the prior art screw type hone 1 includes a hone body 2 comprising a resilient material such as a mixture of urethane rubber and epoxy resin and white alundum grains (hereinafter referred to as the WA grains) mixed therein. As such a polymeric material has insufficient bending or tensile strength, however, there is a fear that the threaded portion may break upon receipt of impacts caused by, e.g., collision or concentrated load. Especially in the case of a screw type hone having a smaller module, the dedendum of the threaded portion is apt to break.

In order to obviate these problems and improve the honing function of the prior art screw type hone 1, it has been proposed to use cubic system boron nitride grains (the CBN grains) in the hone body 2, said grains having a greater harness and exhibiting the most satisfactory honing property with respect to steel materials in comparison with the WA grains. However, such proposal has a disadvantage that the hone body 2 wears out in an earlier stage thanks to the extremely excellent durability of the CBN grains, resulting in earlier escape thereof. Thus, the CBN grains have not effectively been used in the prior art.

Accordingly, the present invention contemplates providing longer service life by using a grain binder formed of a material other than resilient materials such as urethane rubber and epoxy resin, thereby giving rigidity to the overall threaded portion.

OBJECTS OF THE INVENTION

An object of the present invention is to provide a screw type hone assembly for the honing of a gear, having a rigid threaded portion which permits the hone assembly to be used for a very extended period of time without causing breakage thereof during use.

Another object of the present invention is to provide a screw type hone assembly for the honing of a gear, which is adapted to be mounted on the rotating shaft of a honing apparatus such that it is movable in the axial and radial directions relative to the rotating shaft.

A further object of the present invention is to provide a screw type hone assembly for the honing of a gear which can easily be attached to or detached from the rotating shaft of a honing apparatus, and replaced by another screw type hone assembly.

A still further object of the present invention is to provide a screw type hone assembly for the honing of a gear which satisfactorily follows the tooth surface of the gear and makes it more smooth.

A still further object of the present invention is to provide a screw type hone assembly for the honing of a gear, which is designed such that, when a honing grain layer is formed only on the surface of the threaded portion, a suitable binder can optionally be selected for the grains used.

Other objects of the present invention will become obvious from an understanding of the following description of preferred embodiments, and are specified in the appended claims. Numerous advantages not referred to herein will also become apparent to those skilled in the art by carrying out the present invention.

BRIEF DESCRIPTION OF THE DRAWINGS

FIG. 1 is a perspective view of one example of a honing apparatus which is adapted to hone a gear using the screw type hone assembly according to the present invention;

FIG. 3 is a partially enlarged, longitudinal semi-section of the screw type hone assembly according to the second embodiment of the present invention, which is mounted on the rotating shaft of a honing apparatus;

FIG. 4 is a cross-sectional view of the screw type hone assembly of FIG. 3;

DETAILED DESCRIPTION OF THE PREFERRED EMBODIMENTS

Figure 2:
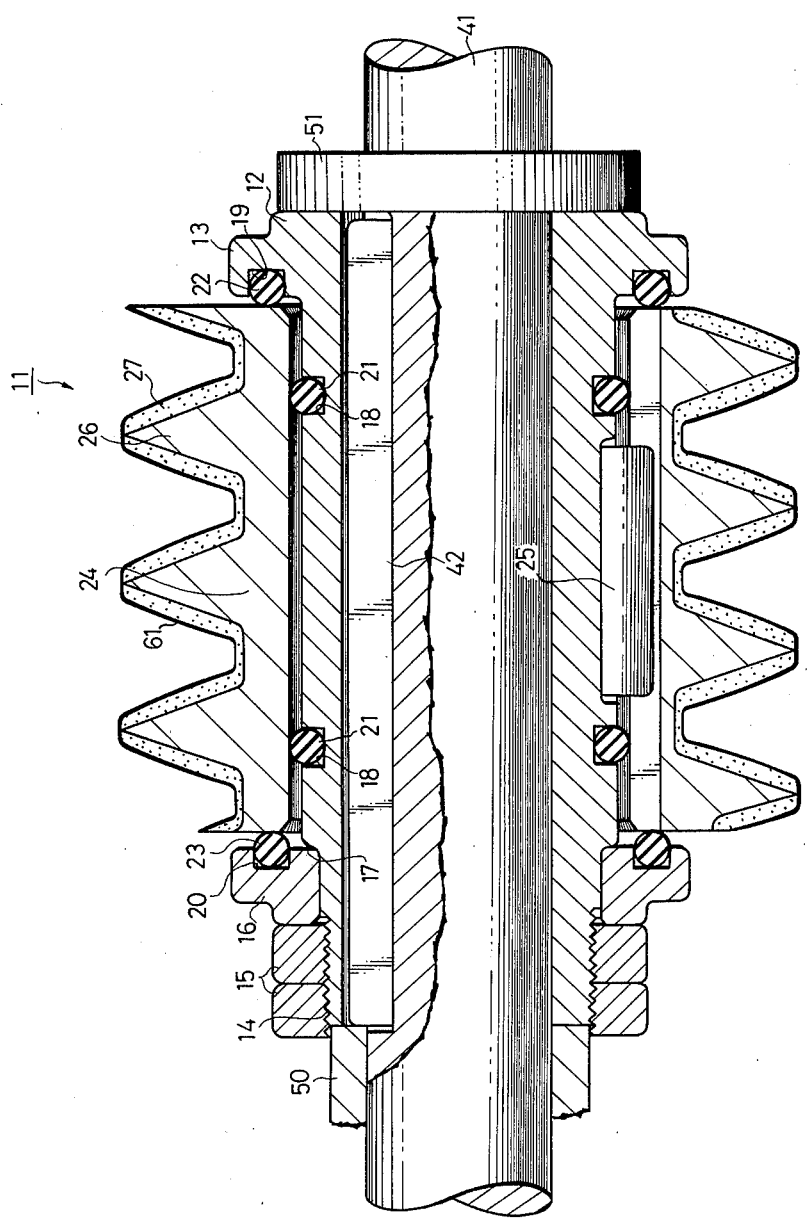
FIG. 2 is a partially enlarged, longitudinal section of the screw type hone assembly according to the first embodiment of the present invention, which is mounted on the rotating shaft of a honing apparatus.
Figure 7:
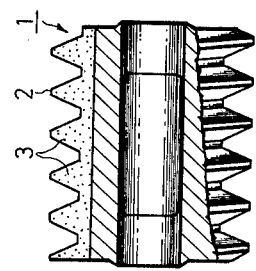
FIG. 7 is a longitudinal section of the prior art screw type hone.

Referring now to FIGS. 1 and 2, there is shown a first embodiment according to the present invention. In this embodiment, a screw type hone indicated by reference numeral 11 is constructed as follows: that is to say, the honing assembly shown in FIG. 1 is provided on its rotating shaft 41 with a cylindrical sleeve 12 which is firmly clamped between a flange portion 51 and a sleeve 50 to avoid axial movement thereof. The cylindrical sleeve 12 is supported by a key groove 42 in such a manner that it can rotate integrally with the rotating shaft 41. The sleeve 12 has at one end a flange retaining portion 13 formed as an integral piece and around the other end a threaded portion 14. Two nuts 15 threadedly fitted over the threaded portion 14 then permit a retaining ring 16 having virtually the same shape as that of the retaining portion 13 to be tightly secured on a stepped portion 17 of the sleeve 12. Receiving grooves 18 and 18, 19 and 20 in an annular form are provided in the outer peripheries of the opposite ends of the sleeve 12, the retaining portion 13 and the retaining ring 16, respectively. These grooves 18 and 18, 19 and 20 are fitted therein with solid or hollow support rings 21 and 21, 22 and 23 formed of a resilient material such as urethane rubber and having a circular shape in section.

The sleeve 12 is fitted on the periphery with a screw type hone body 24 in the substantially cylindrical form and made of a rigid material such as metals, plastics or the like. The hone body 24 is held in place by a key groove 25 such that it can rotate integrally with the sleeve 12, and is resiliently supported on the inner periphery and the right and left end faces by the retaining rings 21 and 21, 22 and 23. Consequently, the hone body 24 can freely move in the axial and radial directions of the rotating shaft 41.

The hone body 24 includes a spirally threaded portion 61 comprising threads 26 formed integrally with the body 24 and a honing grain layer 27 deposited on the surface of the threads 26 and consisting of a honing stone composed of a hard binder and grains. Accordingly, the overall threaded portion 61 possesses rigidity.

The honing grain layer 27 is deposited on the threads 26 such that the CBN grains or diamond grains having a grain size of about Nos. 60–600 according to the JIS specification are open to view. The grain layer 27 may have an optional thickness that is not critical, and may contain a suitable binder in dependence upon the kind and purpose of the grains used. It will be understood that, when use is made of a honing stone of the CBN grains, it is possible to coat the grains on the threads 26 by using a resin or metal bond as the binder.

Reference will now be made to the operation of the screw type hone 11 thus arranged.

As shown in FIG. 1, the screw type hone 11 is fixedly mounted on the rotating shaft 41 of the honing assembly, and a gear 44 is placed on a gear-mounting shaft 43. In order to make a mating engagement between the hone and the gear, a back-lash may be exerted on them. The screw type hone 11 is then rotated by a motor 45, so that the gear 44 turns correspondingly. With a suitable amount of braking exerted on the gear 44 in this state, the threaded surface of the screw type hone 11 comes into slide contact with each tooth surface of the gear whereby the tooth surface is honed. In the meantime, a screw rod 48 is rotated through a belt 46 and a pulley 47 by a motor (not illustrated), so that a table 49 supporting the gear 44 reciprocates in the axial direction of the gear 44, whereby the overall tooth surface is honed. After the motor 45 is reversed to effect reversal of the hone 11, the same operation as aforesaid is repeated to accomplish honing of the entire tooth surface of the gear 44.

In this embodiment, the threaded surface of the hone body 24 having the honing grain layer 27 is adapted to effect facing following the tooth surface of the gear 44, since the hone body 24 is resiliently supported through the support rings 21 and 21, 22 and 23 formed of a resilient material. This ensures that the tooth surface is more smooth and free from mars or damages such as dents.

During the foregoing honing operation, escape of the honing grains caused by abrasion of the hone body 24 is avoided more effectively in comparison with the prior art resilient hone. This is because the honing grain layer 27 is formed by depositing grains such as the CBN grains onto the surface of the hone body 24 formed of a rigid material with the aid of a hard binder. Accordingly, it is possible to make effective use of the grains such as the CBN grains.

In addition, another hone body having a threaded portion 61 with a different module or a honing grain layer 27 with a different grain size may easily be substituted for the hone body 24 by making two nuts 15 loose for removal thereof, since the body 24 and the sleeve 12 are separately provided in the hone according to the present invention. When honing is effected with a gear having a different module or rough-machining and honing are carried out with the same gear, only the replacement of the hone body 24 may be performed with no need for the removal of the sleeve 12 and the like, thus rendering prompt honing possible.

A second embodiment of the present invention will now be explained with reference to FIGS. 3 and 4.

In the second embodiment, the retaining portion 13 of the sleeve 12 and the retaining ring 16 are integrally provided on the outer peripheries with a pair of cylindrical portions 28 and 29 which extend inwardly in the face-to-face relation to the hone body 24. Both cylindrical portions 28 and 29 are provided in the inner peripheries with grooves 30 and 31, respectively, for receiving therein support rings 32 and 33 similar to the aforesaid support rings 21, 22 and 23. These support rings 32 and 33 are adapted to come into resilient contact with the outer periphery of the hone body 24 and support it. In this embodiment, the hone body 24 is formed with threads 26 having a smaller module, and is divided into several or tens of segments 34 extending in the axial direction thereof, as shown in FIG. 4. The spacing 71 between the adjacent segments 34 is such that each segment is movable in the axial and radial directions of the rotating shaft 41 (e.g., about 0.1 mm).

In this embodiment, the rotation of the sleeve 12 is transmitted to the respective segments 34 through the resiliently frictional force produced by the support rings 21, 22, 23, 32 and 33, although there is no key groove between the sleeve 12 and the hone body 24.

Sine the hone body 24 is divided into several or tens of segments 34 in the second embodiment as mentioned above, the hone body 24 follows the tooth surface of a gear 44 in a more satisfactory manner during the honing. As a result, the segments 34 are susceptible to experience resilient and incremental movement, following the tooth surface of the gear 44. This makes the tooth surface of the gear 44 more smooth.

Figure 5:
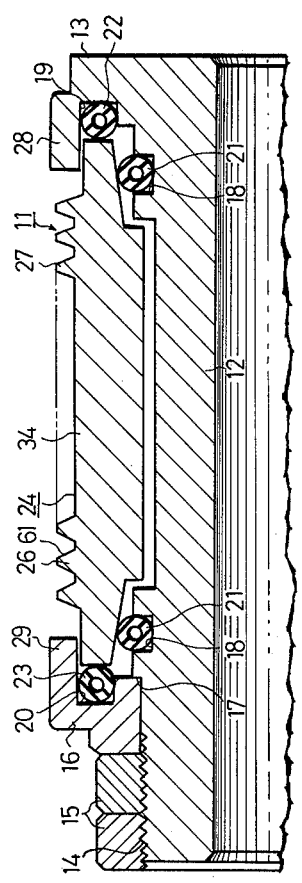
FIG. 5 is a partially enlarged, longitudinal section of the screw type hone assembly according to the third embodiment of the present invention.
Figure 6:
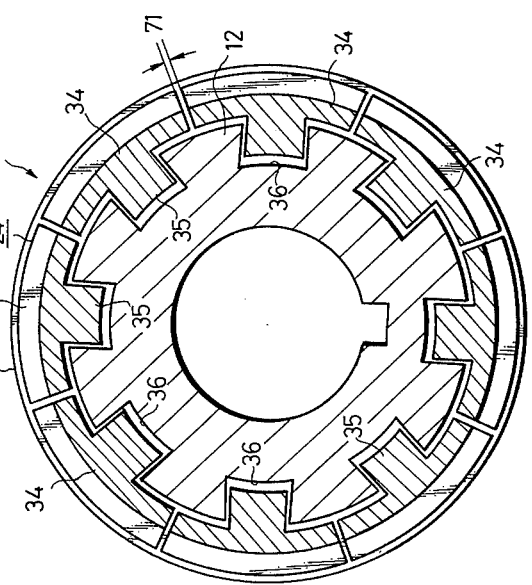
FIG. 6 is a cross-sectional view of the screw type hone assembly of FIG. 5.

A third embodiment of the present invention will now be explained with reference to FIGS. 5 and 6.

In the third embodiment, the support rings 32 and 33 located on the outside of the hone body 24 in the second embodiment are omitted and the remaining support rings 21 and 21, 22 and 23 are formed into a hollow shape. The segments 34 forming the hone body 24 are then provided on the inner peripheries with a guide projections 35 extending in the axial direction of the rotating shaft 41 as integral parts. The sleeve 12 is correspondingly provided in the outer periphery with a plurality of guide grooves 36 adapted to receive therein the guide projections 35. The guide grooves 36 have a length somewhat longer than that of the guide projections 35, so that the segments are movable in the axial and radial directions.

It should be noted that, in order to put the segments 34 in an outwardly urged state, suitable resilient members such as coil springs may be placed between the bottom surfaces of the guide grooves 36 and the insides of the guide projections 35. The spacing 71 between the adjacent segments 34 fulfills the same function as attained in the second embodiment.

As regards other action and function, the second and third embodiments make further improvements in the first embodiment.

While the hone body 24 is resiliently movable in the axial and radial directions of the rotating shaft 41 in the foregoing embodiments, it will be understood that the hone body may be movable in either one direction without departing from the present invention. Even with such an arrangement, the hone body 24 fulfills the same function as discussed in the foregoing since it can escape according to the tooth surface.

In addition, the sleeve 12 may be omitted; in this case, the support rings 18 are attached directly on the outer periphery of the rotating shaft 41, and are detachably or fixedly provided on the outer peripheries with the hone body 24.

As stated in the foregoing, the present invention renders it feasible to prevent breakage of the threaded portion of the screw type hone and escape of honing grains, thereby making improvements in the durability and service life thereof.

As it is apparent that a wide variety of different embodiments may be provided without departing from the spirit and the scope of the present invention, the invention is not limited to such specific embodiments, and is restricted by the appended claims alone.

What I claim is:

1. A screw type hone assembly for the honing of gears, comprising a substantially cylindrical body 24 of the hone having on the outer periphery a spirally threaded portion 61 possessing rigidity in entirety and mounted on a rotating shaft 41 of a honing apparatus for the integral rotation with said shaft 41, said cylindrical body 24 further having cylindrical end portions, each having an outer circumferential face;

a honing grain layer 27 formed on at least the surface of the threaded portion 61 of the hone body 24 and adapted to hone the tooth surface of the gear;

a cylindrical sleeve 12 detachably secured on a rotating shaft 41 for carrying the hone body 24 on the rotating shaft 41, said sleeve 12 having on one end portion thereof a retaining portion 13 which radially projects on the outer periphery and on the other end a retaining ring 16 substantially in the same shape as that of the retaining portion 13, said retaining ring 16 being urged toward said retaining portion 13 by nuts 15 threaded onto the sleeve 12 from outside the retaining ring 16, both said retaining portion 13 and said retaining ring 16 having cylindrical portions 28 and 29, respectively, extending axially inwardly from the respective outer peripheries in a face-to-face relation, each cylindrical portion having an interior circumferential surface overlapping and retaining the outer circumferential face of the respective cylindrical end portion of the body 24, whereby the hone body 24 is fixedly clamped between said retaining portion 13 and said retaining ring 16; and resilient members interposed between said hone body 24 and said sleeve 12, whereby said resilient members permit the body 24 to be elastically axially and radially movable on the rotating shaft 41.

2. A screw type hone assembly for the honing of gears as recited in claim 1, in which said threaded portion 61 has therein threads 26 composed of a rigid material and formed integrally with the hone body 24, and said honing grain layer 27 is provided by coating CBN grains on the surface of said threads 26.

3. A screw type hone assembly for the honing of gears as recited in claim 1, in which said resilient members comprise a pair of support rings 21 wound around the outer periphery of said sleeve 12 and formed of urethane rubber or the like, each of said support rings having its outer periphery kept in resilient contact with the inner periphery of the hone body 24; and a pair of support rings 22 and 23 mounted on the insides of said retaining portion 13 and said retaining ring 16 and formed of urethane rubber or the like, said support rings having the insides kept in resilient contact with the opposite end faces of the hone body 24.

4. A screw type hone assembly for the honing of gears as recited in claim 1 in which the cylindrical portions 28 and 29 are provided on the interior circumferential faces with support rings 32 and 33, respectively; said support rings having the inner peripheries kept in resilient contact with the outer circumferential faces of the opposite cylindrical end portions of the hone body 24.

5. A screw type hone assembly for the honing of gears as recited in claim 1 or 4, in which the hone body 24 is divided into a plurality of segments 34 extending as a whole in the axial direction with a slight open spacing 71 provided between the adjacent segments 34.

6. A screw type hone assembly for the honing of gears as recited in claim 5, in which the respective segments 34 are provided on the inner peripheries with guide projections 35 extending in the axial direction thereof, and the sleeve 12 is provided on the outer periphery with a plurality of guide grooves 36 adapted to movably receive therein the respective guide projections 35.

* * * * *